US008300011B2

(12) United States Patent
Chao et al.

(10) Patent No.: US 8,300,011 B2
(45) **Date of Patent: *Oct. 30, 2012**

(54) POINTER POSITIONING DEVICE AND METHOD

(75) Inventors: Tzu Yi Chao, Hsin-Chu (TW); Meng Tsung Wu, Hsin-Chu (TW); Chih Hsin Lin, Hsin-Chu (TW); Hsin Chia Chen, Hsin-Chu (TW); Chao Chien Huang, Hsin-Chu (TW); Hsuan Hsien Lee, Hsin-Chu (TW); Yi Fang Lee, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 935 days.

This patent is subject to a terminal disclaimer.

(21) Appl. No.: 11/744,364

(22) Filed: May 4, 2007

(65) Prior Publication Data

US 2007/0273646 A1 Nov. 29, 2007

(30) Foreign Application Priority Data

May 5, 2006 (TW) .............................. 95116011 A

(51) Int. Cl.
*G09G 5/00* (2006.01)
*G09G 5/08* (2006.01)
*G06F 3/033* (2006.01)

(52) U.S. Cl. ......... 345/158; 345/156; 345/157; 345/159

(58) Field of Classification Search ........... 345/156–184
See application file for complete search history.

(56) References Cited

U.S. PATENT DOCUMENTS

| | | | | |
|---|---|---|---|---|
| 6,157,368 | A * | 12/2000 | Fager | 345/156 |
| 2003/0193572 | A1 * | 10/2003 | Wilson et al. | 348/207.99 |
| 2005/0107160 | A1 * | 5/2005 | Cheng et al. | 463/37 |
| 2006/0152489 | A1 * | 7/2006 | Sweetser et al. | 345/158 |
| 2006/0209013 | A1 * | 9/2006 | Fengels | 345/156 |

FOREIGN PATENT DOCUMENTS

| | | |
|---|---|---|
| TW | I267754 | 12/2006 |

* cited by examiner

*Primary Examiner* — Sumati Lefkowitz
*Assistant Examiner* — David Tung

(57) ABSTRACT

A pointer positioning device for positioning an aiming point on a display screen of an image display comprises at least one auxiliary point, an image sensor and an optical filter. The auxiliary point is disposed at the peripheral of the display screen for generating a predetermined spectrum. The image sensor receives signals of the predetermined spectrum generated by the auxiliary point. The optical filter is disposed in front of the image sensor for filtering out spectrum outside the predetermined spectrum such that the image sensor can merely sense the signals of the predetermined spectrum, wherein the auxiliary point is utilized as a reference point for correcting an initial setup and positioning the aiming point so as to position the aiming point inside a predetermined range on the display screen. The present invention also provides a pointer positioning method adapted to the pointer positioning device.

24 Claims, 13 Drawing Sheets

POINTER POSITIONING DEVICE AND METHOD

CROSS REFERENCE TO RELATED APPLICATION

This application claims the priority benefit of Taiwan Patent Application Serial Number 095116011 filed on May 5, 2006, the full disclosure of which is incorporated herein by reference.

BACKGROUND OF THE INVENTION

1. Field of the Invention

This invention generally relates to a pointer positioning device and method, which utilizes an image sensor integrated with an optical filter for sensing signals of a predetermined spectrum generated by an auxiliary point for positioning an aiming point of the image sensor on a display screen.

2. Description of the Related Art

A conventional pointer positioning device is disclosed in Taiwan Patent No. 1232769 entitled “A vision feedback system utilized in ray gun”. It is utilized for extracting optical point signals or optical coordinate signals sent from a ray gun to a video game system. A control circuit calculates optical point coordinate signals according to horizontal and vertical synchronizing signals of video signal and sends information of the calculated optical point coordinate signals to an image synthesizing circuit so as to synthesize the cursor aimed by a ray gun onto a corresponding scan point of the screen. In practical use, the above mentioned method has to cooperate with synchronizing signals of image display so as to perform cursor positioning thereon. However, in an image display without synchronizing signals, e.g. a liquid crystal display (LCD), a plasma display panel (PDP) and a projection screen, the cursor positioning function can hardly be performed through this method. Therefore, the above mentioned method has the problem of being limited to the image display having synchronizing signals.

Another pointer positioning apparatus and method is disclosed in Taiwan Patent No. 588258 entitled “A photographic pointer positioning device”. It utilizes a photographic pointer positioning device to process the image out-line so as to obtain coordinate values of four corners of display area, and then obtain the coordinate values corresponding to the aiming point of a video camera by coordinate calculating process so as to replace the method of obtaining the coordinate values of the aiming point by aiming point signals and synchronizing signals utilized in the traditional light gun system. In practical use, although the method can be applied to any types of image display for playing shooting game with the photographic pointer positioning device not being limited by the type of image display, the image recognition process of the display area detected by video camera is still complicated. The video camera has to detect the whole display area no matter which point is aimed by the photographic pointer positioning device, therefore the method still has the problem of needing a video camera with large viewing angle.

Another pointer positioning system is disclosed in US Patent Publication No. 2005/0107160A1, entitled “Photographic pointer positioning system and its operation process”. Although one reference signal is added to facilitate the processing of the image signal processed by an image processing unit, the aforementioned problems, i.e. difficult to recognize image display area and need a video camera with large viewing angle, are still left unsolved.

In addition, when an image sensor is utilized to photograph an image area, the photographing distance of the image sensor from the image area and the rotating angle of the image sensor during photographing may affect the positions of images formed on the sensing array of the image sensor. If it is not adjusted, an error positioning of the aiming point may occur.

Accordingly, it is necessary to further improve the above mentioned pointer positioning device and method, such that the pointer positioning device can be applied to any type of display device, the positioning accuracy can be increased and the viewing angle of the image sensor can be reduced.

SUMMARY OF THE INVENTION

It is an object of the present invention to provide a pointer positioning device and method, which utilizes an auxiliary point generating a predetermined spectrum in cooperated with an image sensor integrated with an optical filter for pointer positioning, the device of the present invention can position an aiming point correctly disregard of a distance of the image sensor from the image display and a rotating angle of the image sensor during photographing.

It is another object of the present invention to provide a pointer positioning device and method, which utilizes an auxiliary point generating a predetermined spectrum in cooperated with an image sensor integrated with an optical filter for pointer positioning, since it is not necessary to photograph the whole display area of the image display, the viewing angle of the image sensor applied in the present invention can be decreased.

It is a further object of the present invention to provide a pointer positioning device and method, which utilizes an auxiliary point generating a predetermined spectrum in cooperated with an image sensor integrated with an optical filter for pointer positioning and can be applied to any types of image display.

In order to achieve the above objects, the pointer positioning device of the present invention is utilized for positioning an aiming point on a display screen of an image display, which mainly includes at least one auxiliary point, an image sensor and an optical filter. The auxiliary point is disposed at the peripheral of the display screen for generating a predetermined spectrum. The image sensor is used for receiving signals of the predetermined spectrum generated from the auxiliary point. The optical filter is disposed in front of the image sensor for filtering out spectrum outside the predetermined spectrum such that the image sensor can merely sense the signals of the predetermined spectrum; wherein the auxiliary point is utilized as a reference point for correcting an initial setup and positioning the aiming point so as to position the aiming point on the display screen.

According to another characteristic of the present invention, an image sensor for positioning an aiming point on a display screen of an image display is disclosed, wherein an optical filter is disposed in front of the image sensor such that the image sensor can merely sense signals of a predetermined spectrum generated by at least one auxiliary point disposed at the peripheral of the display screen; the auxiliary point is utilized as a reference point for correcting an initial setup and positioning the aiming point. The image sensor mainly includes a sensing unit for receiving the signals of the predetermined spectrum generated by the auxiliary point and transferring the signals of the predetermined spectrum to electrical signals; and a processing and storage unit for receiving the electrical signals, calculating the initial setup obtained by correcting the aiming point on the display screen according to the auxiliary point, storing the initial setup, and performing the calculation of positioning the aiming point.

The present invention further provides a pointer positioning method for positioning an aiming point pointed by the optical axis of an image sensor on a plane, which is formed by four corners of a display screen of an image display. The method mainly includes the steps of: disposing at least one auxiliary point at the peripheral of the display screen for generating a predetermined spectrum; disposing an optical filter in front of the image sensor for filtering out spectrum outside the predetermined spectrum such that the image sensor can merely sense signals of the predetermined spectrum from the auxiliary point; and correcting and positioning the aiming point according to the spatial relationship between the aiming point and the signals of the predetermined spectrum of the auxiliary point sensed by the image sensor.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE PREFERRED EMBODIMENT

Figure 1A:
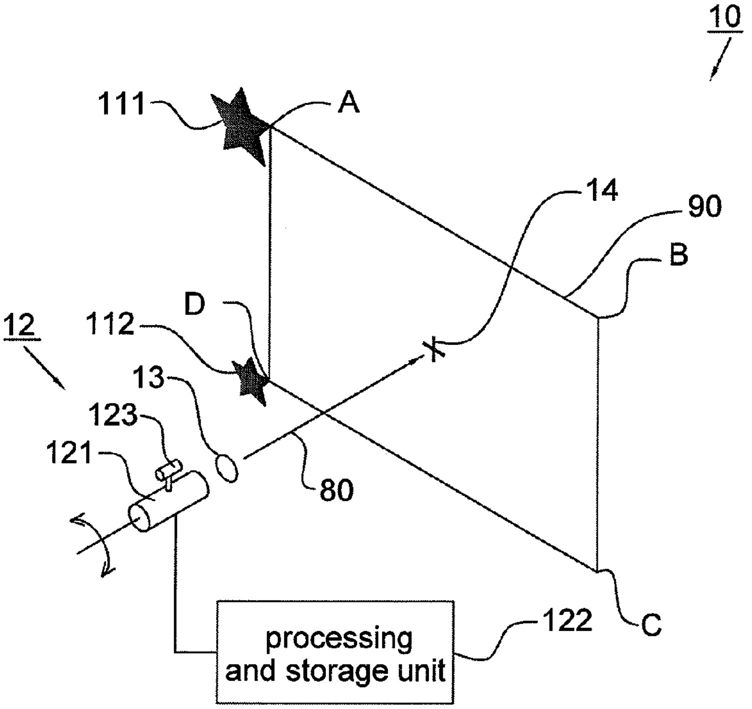
FIG. 1*a* shows a schematic diagram of a pointer positioning device according to one embodiment of the present invention.
Figures 1B, 1C, 1D:
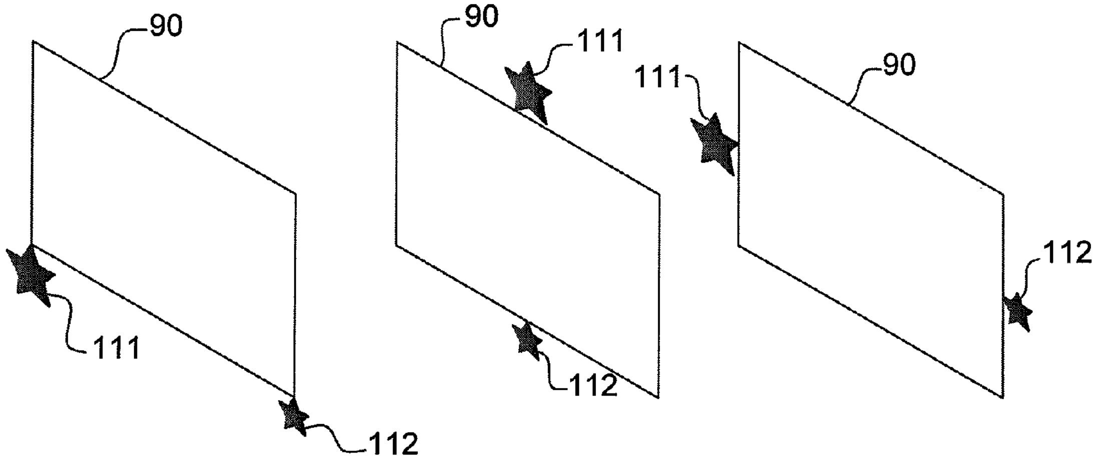
FIG. 1*b* shows a configuration of the auxiliary points of the pointer positioning device according to the embodiment of the present invention.
FIG. 1*c* shows another configuration of the auxiliary points of the pointer positioning device according to the embodiment of the present invention.
FIG. 1*d* shows a further configuration of the auxiliary points of the pointer positioning device according to the embodiment of the present invention.

First, it should be noted that in the following description of the present invention, similar elements are designated by the same reference numerals.

Referring to FIG. 1*a*, it shows a pointer positioning device 10 according to one embodiment of the present invention, which can be applied to position an aiming point on an image display, e.g. a projection device, a display of a game machine system or a display of a computer system. The image display has a display screen 90 for displaying image, e.g. the display screen 90 may be a part of or the whole image display area of a projection screen, a display screen of a game machine system or a display screen of a computer system, and “A”, “B”, “C” and “D” are four points on the display screen 90 or outside the display screen 90, e.g. four corners of the display screen 90 as shown in FIG. 1*a*. The four points form a quadrangle.

The pointer positioning device 10 includes two auxiliary points 111 and 112, an image sensor 12 and an optical filter 13. The auxiliary points 111 and 112 are light sources of a predetermined spectrum, such as IR (infrared) light sources, and they may be emitting light sources or non-emitting light sources. If the auxiliary points 111 and 112 are emitting light sources, they generate predetermined spectrum, e.g. IR LED (light emitting diode) for generating IR spectrum; if the auxiliary points 111 and 112 are non-emitting light sources, they can reflect the predetermined spectrum, e.g. IR mirror for reflecting IR spectrum. If the auxiliary points 111 and 112 are non-emitting light sources, preferably the pointer positioning device 10 further includes a light source 123 for generating the predetermined spectrum so as to provide the predetermined spectrum to be reflected by the non-emitting light sources (auxiliary points 111 and 112). The light source 123 can be fixed on the image sensor 12, and it also can be screwed onto or integrated on the image sensor 12 by other method during or before operation. The light source 123 also can be disposed at the peripheral of the image sensor 12 not to be integrated thereon according to practical requirement. In addition, in other embodiment, environment light also may be utilized as a light source to provide the predetermined spectrum to be reflected by the non-emitting light source (auxiliary points 111 and 112).

It should be noted that the photographing distance and the rotating angle of the image sensor 12, e.g. rotating along the arrow shown in FIG. 1*a*, may effect the positions of detected images on the sensing array of the image sensor 12. In order to increase the accuracy of pointer positioning, in the embodiment of the present invention, two auxiliary points are utilized as an example for illustrating the procedure of positioning the aiming point. However, it is not used to limit the present invention; in practical use, only one auxiliary point can be utilized for assisting pointer positioning. It also should be noted that the sizes of the auxiliary points 111 and 112 may be the same or different, and the detailed reason will be described hereafter.

Referring to FIGS. 1*a* to 1*d*, although the auxiliary points 111 and 112 can be disposed in any positions surrounding to the image display, preferably they are disposed as the configurations shown in FIGS. 1*a* to 1*d*. For the reason that the images need to be detected by the image sensor 12 during photographing are the signals generated by the auxiliary points 111 and 112 rather than the whole display area of the display screen 90. If the auxiliary points 111 and 112 are disposed as the configurations shown in FIGS. 1*a* to 1*d*, the area need to be detected by the image sensor 12 is minimized thereby the viewing angle of the image sensor 12 can be decreased. In addition, the auxiliary points 111 and 112 may be integrated on the image display or manufactured as an individual auxiliary positioning device according to different applications.

The image sensor 12 is operated in front of the display screen 90, and may have an optical axis 80 to project an aiming point 14 on the display screen 90, e.g. a spot projected by a projector, a bullet drop point projected by a light gun or a cursor controlled by a mouse. In other embodiment, the optical axis 80 may be a fictitious axis. The image sensor 12 mainly includes a sensing unit 121 and a processing and storage unit 122. The image sensor 12 is utilized for detecting optical image signals containing the images of the auxiliary points 111 and 112. The sensing unit 121 may be a CMOS (complementary metal-oxide semiconductor) image sensor or a CCD (charge-coupled Device) image sensor, which can transfer the detected optical image signals to electrical image signals. The processing and storage unit 122 is electrically coupled to the sensing unit 121. It utilizes the pointer positioning method described in the latter paragraphs to calculate an initial setup by correcting the aiming point 14 of the image sensor 12 according to the auxiliary points 111 and 112 after receiving the electrical image signals and perform the calculation of positioning the aiming point 14. The image sensor 12 of the present invention can be used as a pointer for pointing inside a predetermined range on an image screen, e.g. a pointer of a projection screen system, a light gun of a game machine system or a cursor controller of a computer system.

The optical filter 13 is disposed in front of the image sensor 12 for filtering out spectrum outside the predetermined spectrum generated from the auxiliary points 111 and 112, such that the image sensor 12 can only detect the signals of the predetermined spectrum. In this embodiment, the optical filter 13 is preferably an IR filter (infrared filter). In this manner, since the sensing unit 121 of the image sensor 12 can not accept signals outside the predetermined spectrum, the information that will be processed by the processing and storage unit 122 only includes the initial setup information of the auxiliary points 111 and 112 and spatial relationships between the aiming point 14 on the display screen 90 and the auxiliary points 111 and 112. Therefore, the calculating complexity can be significantly decreased and the positioning accuracy can be improved. In addition, the optical filter 13 can be fixed on the image sensor 12 before leaving the factory; it also can be screwed onto or integrated on the image sensor 12 by other kinds of methods during operating.

Figure 2A:
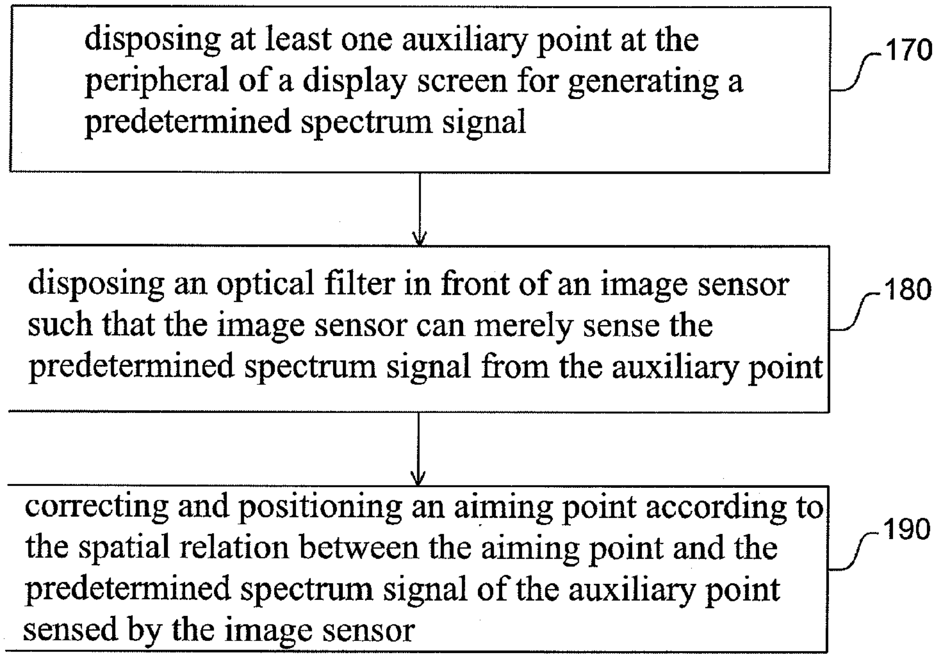
FIG. 2*a* shows a flow chart of a pointer positioning method according to one embodiment of the present invention.
Figure 2B:
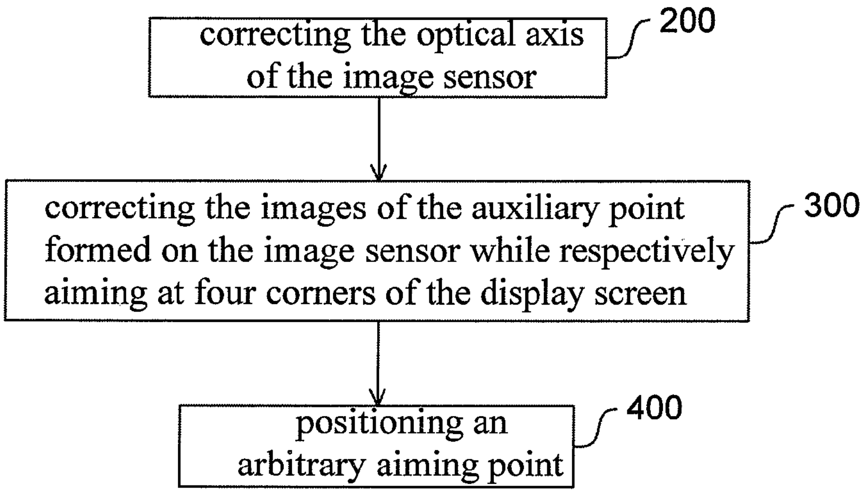
FIG. 2*b* shows a flow chart of positioning an aiming point according to the first embodiment of the present invention, wherein the pointer positioning is based on absolute coordinate.

Referring to FIG. 2*a*, there is disclosed a pointer positioning method according to the embodiment of the present invention. The method can be applied to position an aiming point 14 pointed through the optical axis 80 of the image sensor 12 on a plane. In this embodiment, the plane is formed by four corners "A", "B", "C" and "D" of the display screen 90. The pointer positioning method includes the following steps: disposing two auxiliary points 111 and 112 at the peripheral of the display screen 90 for generating a predetermined spectrum (step 170); disposing an optical filter 13 in front of the image sensor 12 for filtering out spectrum outside the predetermined spectrum such that the image sensor 12 can merely receive signals of the predetermined spectrum from the auxiliary points 111 and 112 (step 180); and correcting and positioning the aiming point 14 according to the spatial relationship between the aiming point 14 and the signals of the predetermined spectrum of the auxiliary points 111 and 112 sensed by the image sensor 12 (step 190). Wherein, the correcting and positioning the aiming point 14 step, i.e. step 190, can be performed by pointer positioning method based on absolute coordinate according to the first embodiment of the present invention, as shown in FIG. 2*b*, which comprises the steps of: correcting the optical axis 80 of the image sensor 12 (step 200); correcting the images of the auxiliary points 111 and 112 formed on the image sensor 12 while respectively aiming at four corners of the display screen 90 (step 300); and positioning an arbitrary aiming point 14 (step 400).

Figure 2C:
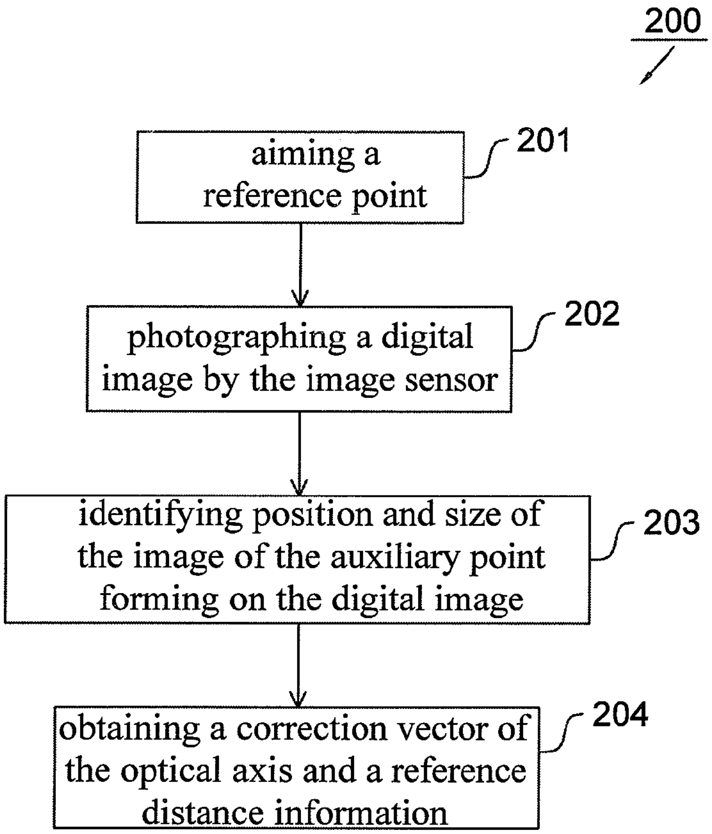
FIG. 2*c* shows part of the flow chart of the pointer positioning method based on absolute coordinate according to the first embodiment of the present invention shown in FIG. 2*b*.

Referring to FIG. 2*c*, there is disclosed a flowchart of correcting the optical axis 80 of the image sensor 12, i.e. step 200, which comprises the following steps: aiming a reference point by the image sensor 12 (step 201); photographing a digital image by the image sensor 12 (step 202); identifying positions and sizes of the auxiliary points 111, 112 forming on the digital image (step 203); and obtaining a correction vector of the optical axis 80 and a reference distance information (step 204).

Figure 4:
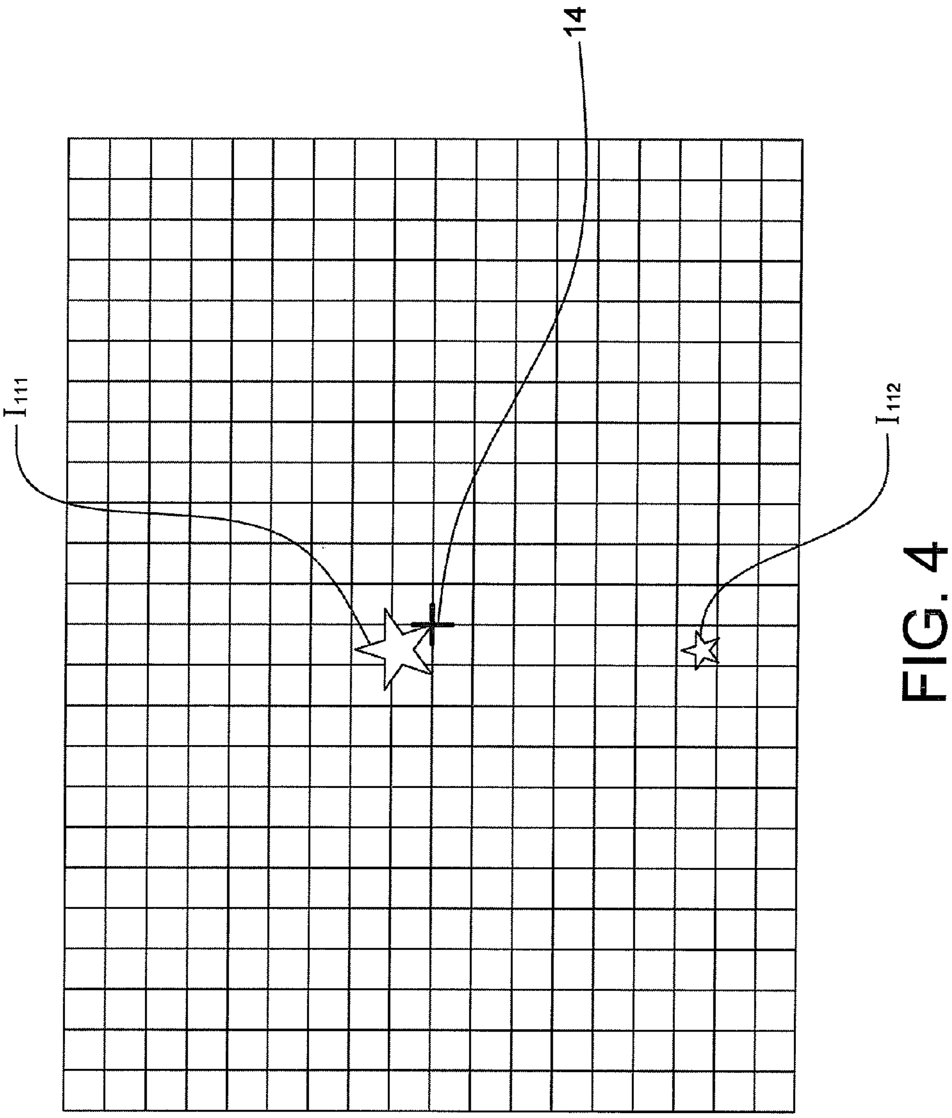
FIG. 4 shows a schematic diagram of a method to obtain the correction vector used in the pointer positioning device and method according to the embodiments of the present invention.
Figure 5:
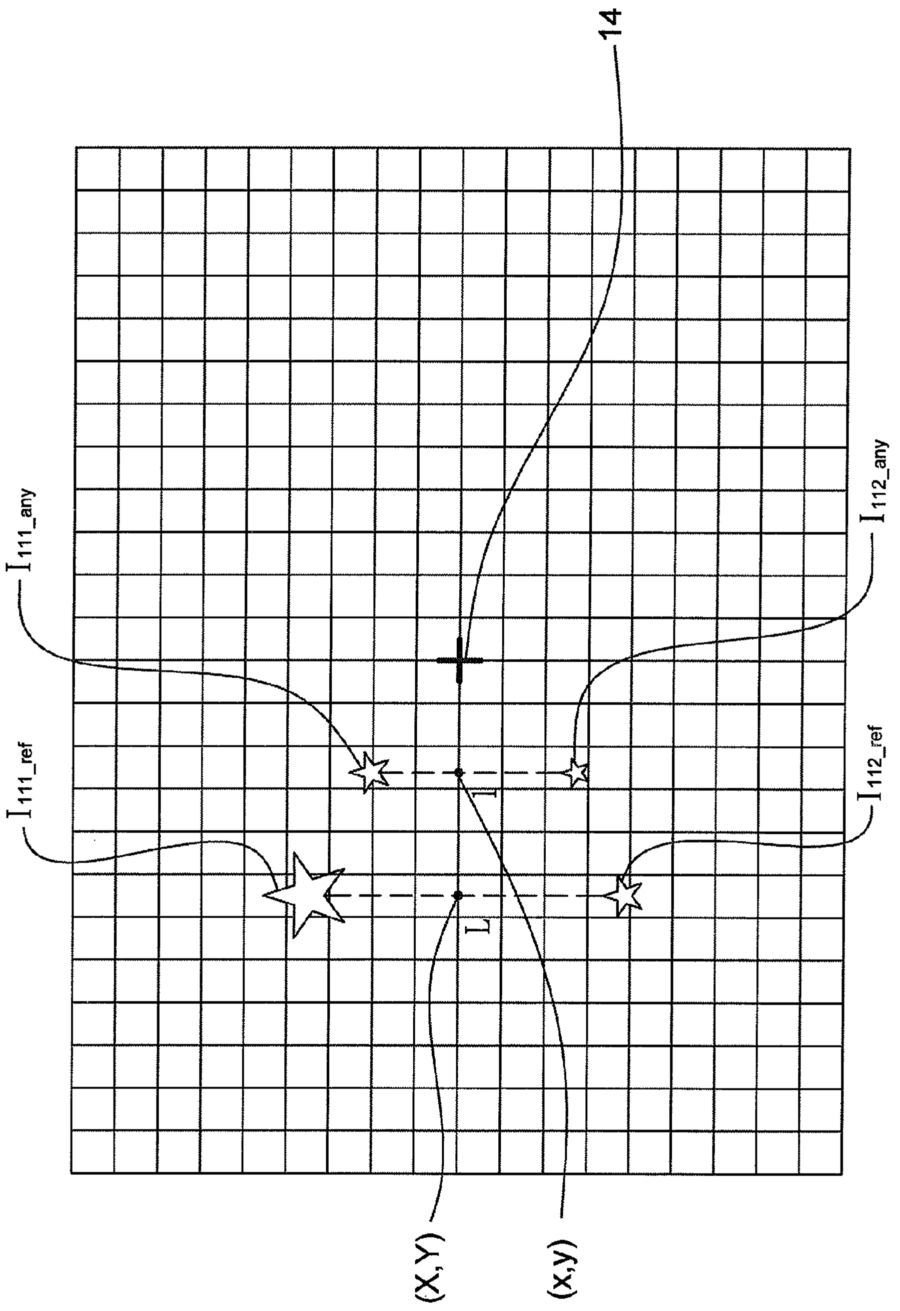
FIG. 5 shows a schematic diagram of a method to obtain the reference distance information used in the pointer positioning device and method according to the embodiments of the present invention.

Referring to FIGS. 2*c*, 4 and 5, the detail of correcting the optical axis 80 of the image sensor 12, i.e. step 200, is described. It should be noted that step 200 may be a correction procedure before the products using the method leaves the factory, or it may be a correction procedure during operation or setup. First, aiming a reference point through the optical axis 80 of the sensing unit 121 (step 201), e.g. the auxiliary point 111. Then the sensing unit 121 can detect an optical image as shown in FIG. 4 (step 202), where the bold cross represents an aiming point 14 of the image sensor 12 and $I_{111}$, $I_{112}$ respectively represent images of the auxiliary points 111 and 112 forming on the sensing unit 121 of the image sensor 12. The optical image is then transferred to an electrical image and sent to the processing and storage unit 122, which identifies the positions and sizes of the images $I_{111}$ and $I_{112}$ corresponding to the auxiliary points 111 and 112 and stores the information of the identification. The processing and storage unit 122 can identify that the aiming point 14 is aiming at the auxiliary point 111 or the auxiliary point 112 through a predetermined principle, e.g. the aiming point 14 is predetermined aiming at the auxiliary point 111 in this embodiment; the processing and storage unit 122 can also identify that the aiming point 14 is aiming at the auxiliary point with larger area through a predetermined area determining principle, i.e.

a principle to determine the aiming point by means of the areas or sizes of the auxiliary points.

Referring to FIG. 4 again, it is a digital image detected by the image sensor 12 while aiming at the auxiliary point 11 through the optical axis 80. It can be seen that the aiming point 14 and the image $I_{111}$ corresponding to the auxiliary point 111 sensed by the image sensor 12 do not overlap with each other, hence the optical axis 80 has to be corrected such that the optical axis 80 can aim at the desired point without displacement, i.e. aiming at position $I_{111}$ in this embodiment. From this digital image, the processing and storage unit 122 calculates a correction vector of the optical axis 80 (step 204), i.e. a vector between the aiming point 14 and the image $I_{111}$ formed on the image sensor 12, and the correction vector will be stored in a memory (not shown) of the processing and storage unit 122 for being utilized in the following steps.

Referring to FIG. 5, a reference distance information, including an average coordinate (X, Y) of the images of the auxiliary points 111 and 112 formed on the image sensor 12 while photographing at a predetermined distance, e.g. 3 meters, from the display screen 90 and a distance L therebetween, can be stored in the processing and storage unit 122 of the image sensor 12, i.e. step 204, for being utilized in the calculation of pointer positioning. In FIG. 5, $I_{111\text{-}ref}$ and $I_{112\text{-}ref}$ are images of the auxiliary points 111 and 112 formed on the image sensor 12 while photographing at the above mentioned distance; $I_{111\text{-}any}$ and $I_{112\text{-}any}$ are images need to be corrected, which are images of the auxiliary points 111 and 112 formed on the image sensor 12 while photographing at any distance (not the predetermined distance) from the display screen 90 but aiming at the same point. As can be seen, since the detected images $I_{111\text{-}any}$ and $I_{112\text{-}any}$ are smaller than $I_{111\text{-}ref}$ and $I_{112\text{-}ref}$, $I_{111\text{-}any}$ and $I_{112\text{-}any}$ represent the images photographing at a distance larger than the predetermined distance. A distance compensation then is performed by the processing and storage unit 122 according to a proportional relationship between a distance "L" between the images $I_{111\text{-}ref}$ and $I_{112\text{-}ref}$ and a distance "l" between the images $I_{111\text{-}any}$, $I_{112\text{-}any}$, i.e. the coordinate (x, y) will be corrected by the equation of (x', y')=(xL/l, yL/l), where (x', y') denotes the average coordinate of the images of the auxiliary points 111 and 112 formed on the image sensor 12 after the distance compensation is performed. If (x', y')=(X, Y), the images $I_{111\text{-}ref}$, $I_{112\text{-}ref}$ and $I_{111\text{-}any}$, $I_{112\text{-}any}$ represent the images of the auxiliary points 111 and 112 using the image sensor 12 aiming at the same point on the display screen 90 with different photographing distances. As mentioned above, a correction vector of the optical axis 80, i.e. a vector between the aiming point 14 and the image $I_{111}$ as shown in FIG. 4, and a reference distance information, i.e. average coordinate (X, Y) of the images of the two auxiliary points 111 and 112, and the distance therebetween, i.e. "L", are stored in the processing and storage unit 122 as part of initial setup of the pointer positioning method after finishing the correcting the optical axis of the image sensor step (step 200).

Figure 2D:
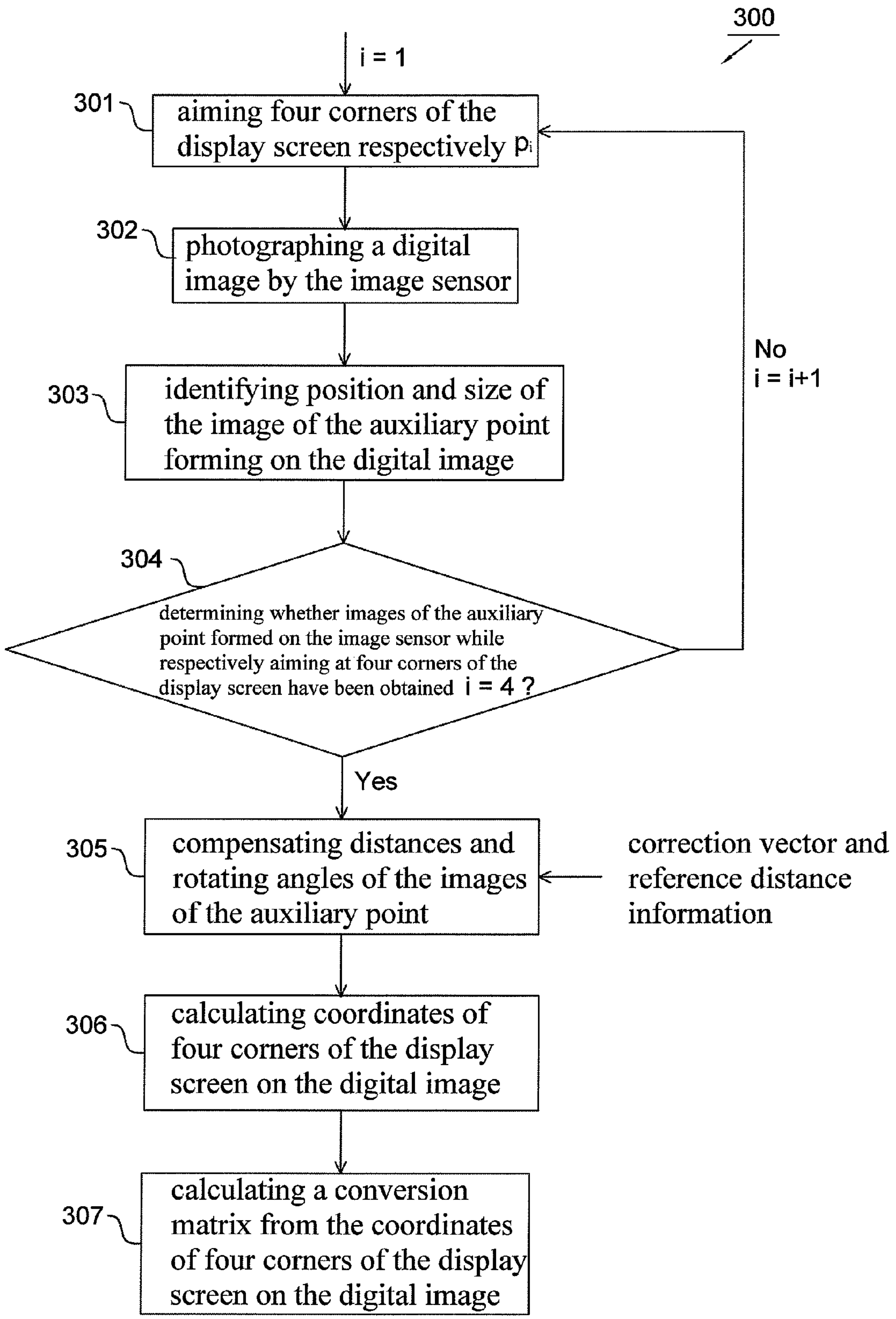
FIG. 2*d* shows another part of the flow chart of the pointer positioning method based on absolute coordinate according to the first embodiment of the present invention shown in FIG. 2*b*.

Referring to FIG. 2*d*, there is disclosed a flowchart of correcting the images of the auxiliary points 111, 112 formed on the image sensor 12 while respectively aiming at four corners of the display screen 90, i.e. step 300, which comprises: aiming four corners "A", "B", "C" and "D" of the display screen 90 by the image sensor 12 (step 301); photographing a digital image by the image sensor 12 (step 302); identifying positions and sizes of the images of the auxiliary points 111, 112 forming on the digital image (step 303); determining whether images of the auxiliary points 111, 112 formed on the image sensor 12 while respectively aiming at four corners "A", "B", "C" and "D" of the display screen 90 have been obtained, if not, proceeding the steps 301 to 303 again; if yes, proceeding step 305; compensating distance and rotating angle of the images of the auxiliary points 111, 112 by using the correction vector of the optical axis 80 and the reference distance information for correction (step 305); calculating coordinates of four corners "A", "B", "C" and "D" of the display screen 90 formed on the digital image (step 306); and calculating a conversion matrix from the coordinates of four corners "A", "B", "C" and "D" of the display screen 90 on the digital image (step 307). In should be noted that the step 307 may be neglected according to different applications. If it is performed, the calculation amount during correction process, i.e. step 300, is increased but the calculation of pointer positioning, i.e. step 400, can be simplified and memory requirement can be decreased.

Figure 6:
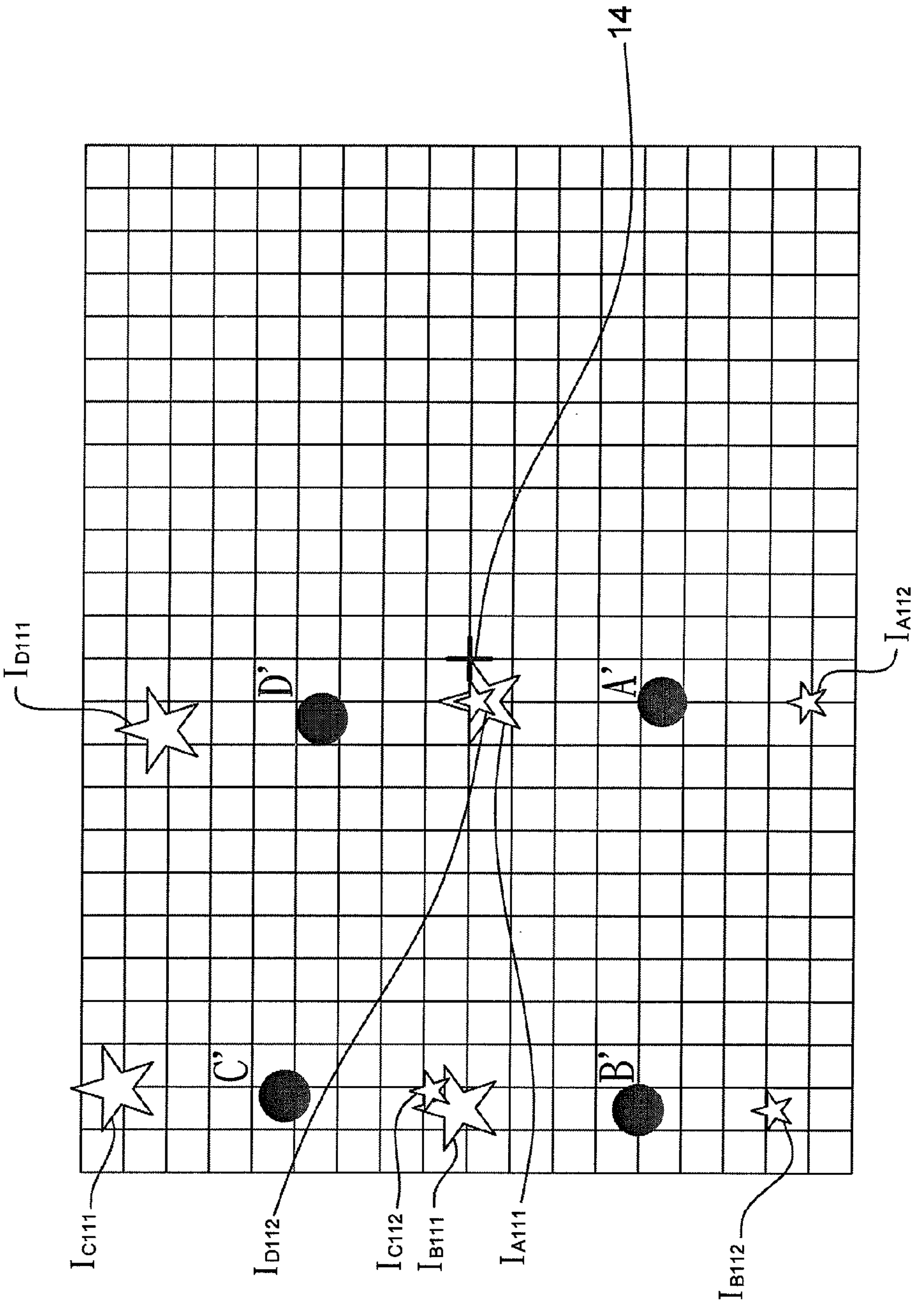
FIG. 6 shows a schematic diagram of the images of the reference points while respectively aiming at four corners of the image display formed by the pointer positioning device and method according to the embodiments of the present invention.

Referring to FIG. 2*d* and FIGS. 6 to 8, the detail of correcting the images of the auxiliary points 111, 112 formed on the image sensor 12 while respectively aiming at four corners of the display screen 90, i.e. step 300, is described. It should be noted that step 300 may be a correction procedure before the products using the method leaves the factory; it also may be performed during setup or operation after the products being sold. Utilize the aiming point 14 to respectively aim at four corners "A", "B", "C" and "D" of the display screen 90 through the optical axis 80, which has been corrected in the step 200 (step 301), and photograph a digital image by the image sensor 12 whenever aiming at each of the four corners (step 302). Then identify positions and sizes of the images of the auxiliary points 111, 112 formed on the digital image (step 303). Since they are identical to the steps 202 and 203 aforementioned, they will not be described in detail herein. After the images of the auxiliary points 111, 112 formed on the image sensor 12 while respectively aiming at four corners "A", "B", "C" and "D" of the display screen 90 by using the image sensor 12 have been obtained, i.e. step 304, a digital image will be formed as shown in FIG. 6. Where $I_{A111}$, $I_{B111}$, $I_{C111}$ and $I_{D111}$ denote images of the auxiliary point 111 formed on the image sensor 12 while the aiming point 14 respectively aiming at four corners "A", "B", "C" and "D" of the display screen 90; $I_{A112}$, $I_{B112}$, $I_{C112}$ and $I_{D112}$ denote images of the auxiliary point 112 formed on the image sensor 12 while the aiming point 14 respectively aiming at four corners "A", "B", "C" and "D" of the display screen 90; "A'" is the average coordinate of $I_{A111}$ and $I_{A112}$; "B'" is the average coordinate of $I_{B111}$ and $I_{B112}$; "C'" is the average coordinate of $I_{C111}$ and $I_{C112}$; "D'" is the average coordinate of $I_{D111}$ and $I_{D112}$.

Figure 7:
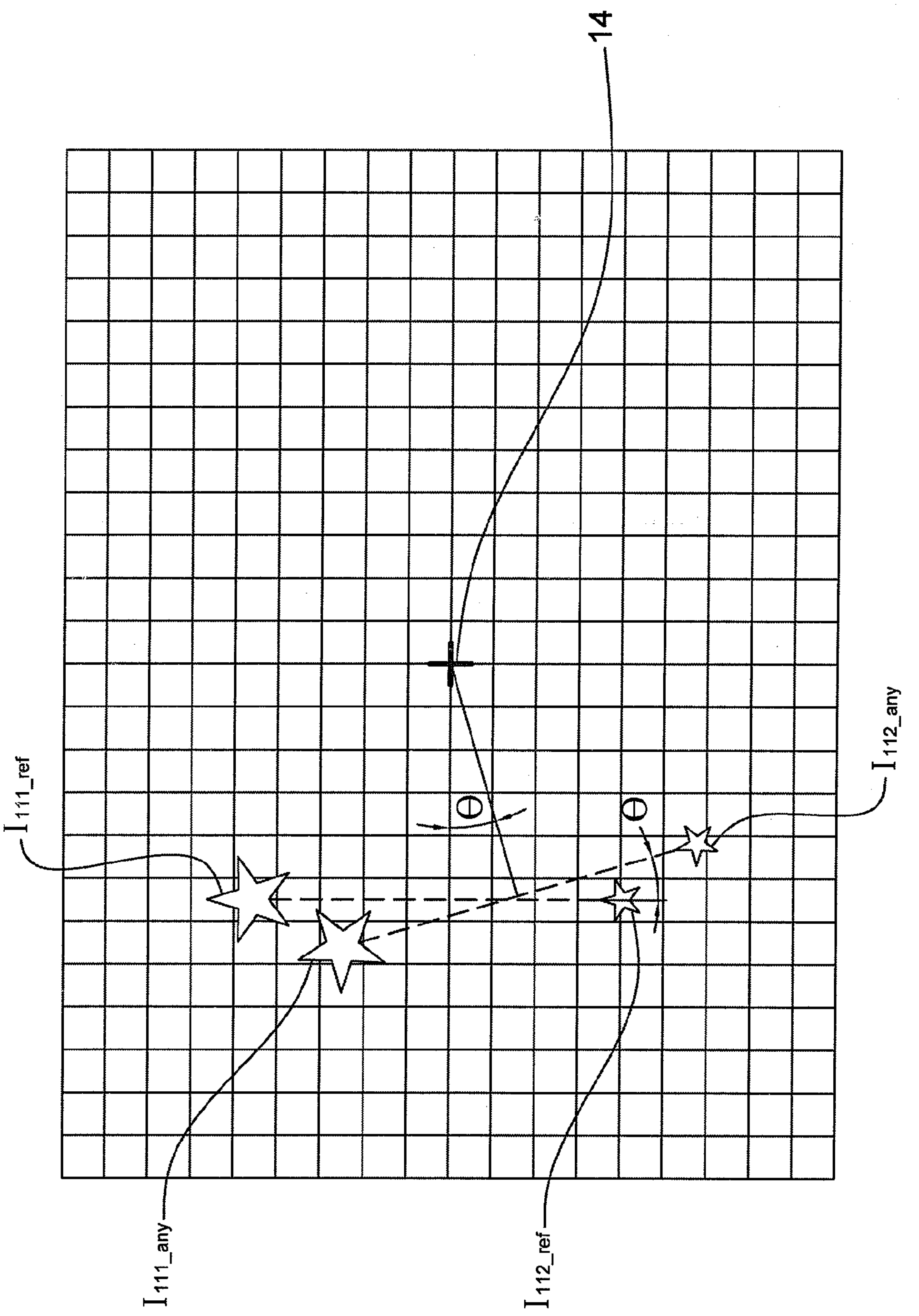
FIG. 7 shows a schematic diagram of the rotating angle compensation used in the pointer positioning device and method according to the embodiments of the present invention.

Referring to FIG. 7, it shows the method to perform rotating angle compensation in step 305, where $I_{111\text{-}ref}$ and $I_{112\text{-}ref}$ are images of the auxiliary points 111 and 112 formed on the image sensor 12 while photographing at the reference distance, as described in step 204, and they are pre-stored in the memory of the processing and storage unit 122. They are utilized as reference points of calculating the rotating angle of the image sensor 12 during photographing. $I_{111\text{-}any}$ and $I_{112\text{-}any}$ are images need to be corrected, e.g. the images of the auxiliary points 111 and 112 detected by the image sensor 12 under arbitrary rotating angle while aiming at the same point as the time obtaining the reference image, i.e. $I_{111\text{-}ref}$ and $I_{112\text{-}ref}$. Since a rotating angle deviation θ exists with respected to the reference image, the image will be corrected by the processing and storage unit 122 according to the following equation (1):

$$\begin{bmatrix} X' \\ Y' \end{bmatrix} = \begin{bmatrix} \cos\theta & -\sin\theta \\ \sin\theta & \cos\theta \end{bmatrix} \begin{bmatrix} X \\ Y \end{bmatrix} \quad (1)$$

wherein, θ denotes a rotating angle of the image sensor 12 while photographing with respect to taking the reference image; X and Y denote average coordinates of the images of the auxiliary points 111 and 112 formed on the digital image before being compensated; X' and Y' denote average coordinates of the images of the auxiliary points 111 and 112 formed on the digital image after being compensated, and the digital image may be an image shown in FIG. 7. It should be noted that if the auxiliary points 111 and 112 have identical size or area, then when the rotating angle exceeds 180 degrees, the image sensor 12 may not able to correctly recognize the auxiliary points 111 and 112 thereby causing incorrect rotating angle compensation. In one embodiment, a mercury switch (not shown) may be integrated inside the image sensor 12 so as to solve this problem. In the embodiment of the present invention, the problem is solved by utilizing different auxiliary points 111 and 112, e.g. different sizes or areas. Therefore misrecognition problem caused by unable to distinguish the auxiliary points 111 and 112 can be solved and the rotating angle compensation can be correctly performed under any rotating angle during photographing.

The distance compensation in step 305 is performed based on the reference distance information obtained in step 200 such that the deviation caused by different photographing distance can be compensated. The correction vector of the optical axis 80 also should be added simultaneously so as to obtain correct coordinates of four corners "A'", "B'", "C'" and "D'" (step 306), which will be stored in the memory of the processing and storage unit 122 of the image sensor 12. In addition, although it is possible to realize correction of the aiming point 14 by only one auxiliary point, in this embodiment, two auxiliary points are utilized to facilitate the distance and rotating angle compensation and further increase accuracy of pointer positioning.

Figure 8:
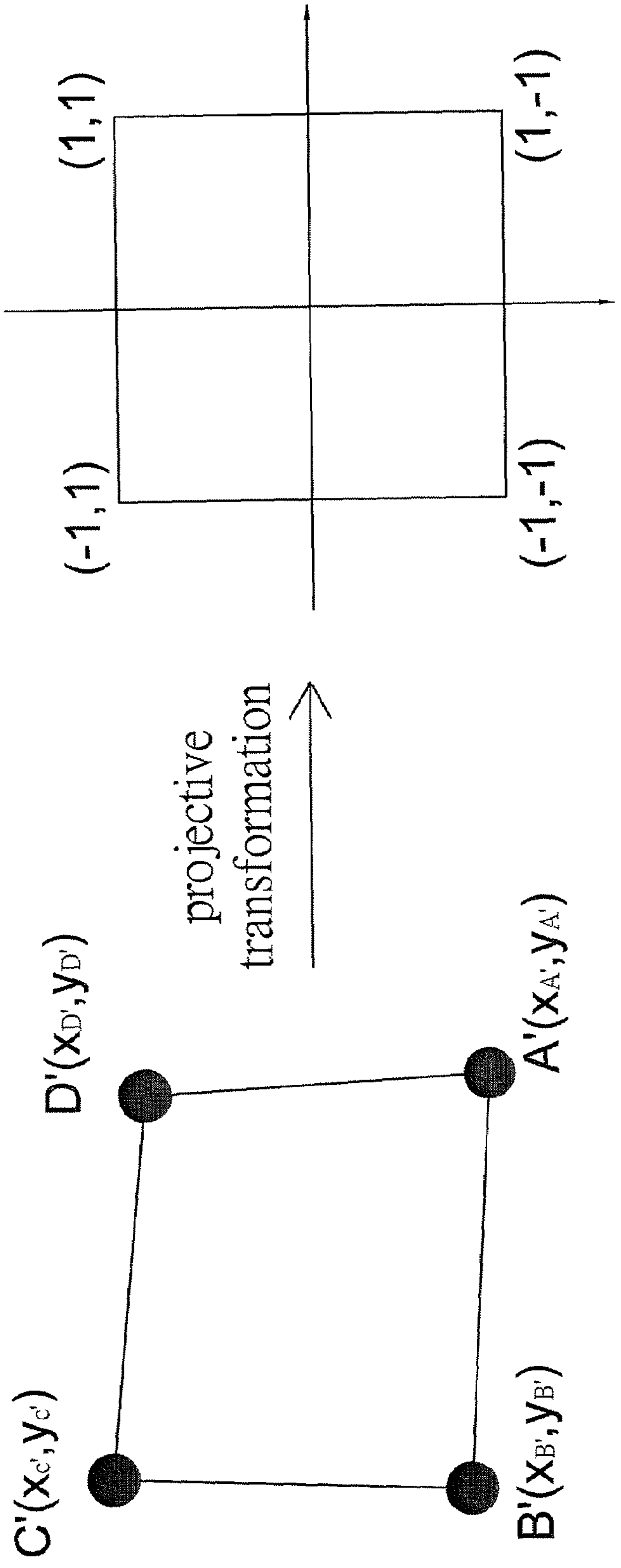
FIG. 8 shows a schematic diagram of the projective transformation used in the pointer positioning device and method according to the embodiments of the present invention.

Referring to FIG. 8, it shows the method to obtain conversion matrix from the coordinates of four corners of the display screen 90 obtained in the step 306. The conversion procedure is also performed by the processing and storage unit 122. Where A'($x_{A'}$, $y_{A'}$), B'($x_{B'}$, $y_{B'}$), C'($x_{C'}$, $y_{C'}$) and D'($x_{D'}$, $y_{D'}$) represent average coordinates of the images of two auxiliary points 111 and 112 formed on the image sensor 12 while the aiming point 14 is respectively aimed at four corners "A", "B", "C" and "D" of the display screen 90. Because of the photographing angle of the image sensor 12 and the distortion of the image during photographing, a quadrangle formed by "A", "B", "C" and "D" may not be a regular rectangular. By using a conventional projective transformation, a non-regular quadrangle can be converted into a standard unit square, i.e. a square with unit sides, and the conversion matrix will be stored in the processing and storage unit 122 of the image sensor 12 for being utilized in the following steps. Since "A'", "B'", "C'" and "D'" are average coordinates of the images of four corners of the display screen 90, any point inside the range of the display screen 90 converted through the conversion matrix will be appeared inside the unit square. As mentioned above, after finishing the step 300, correction information (initial setup), including a conversion matrix, distance compensation and rotating angle compensation information, will be stored in the processing and storage unit 122. In this manner, the whole initial setup of the pointer positioning method is finished and it will be utilized in the following steps.

It should be noted that the substep 307 of the step 300 can be ignored, i.e. the positioning an arbitrary aiming point step (step 400) still can be performed only with the average coordinates of the four corners "A'", "B'", "C'" and "D'" of the display screen 90 stored in the processing and storage unit 122 of the image sensor 12. In this manner, the calculating amount during correction procedure, i.e. step 300, can be reduced but the calculating amount and memory requirement during the positioning an arbitrary aiming point step, i.e. step 400, are increased.

Figure 2E:
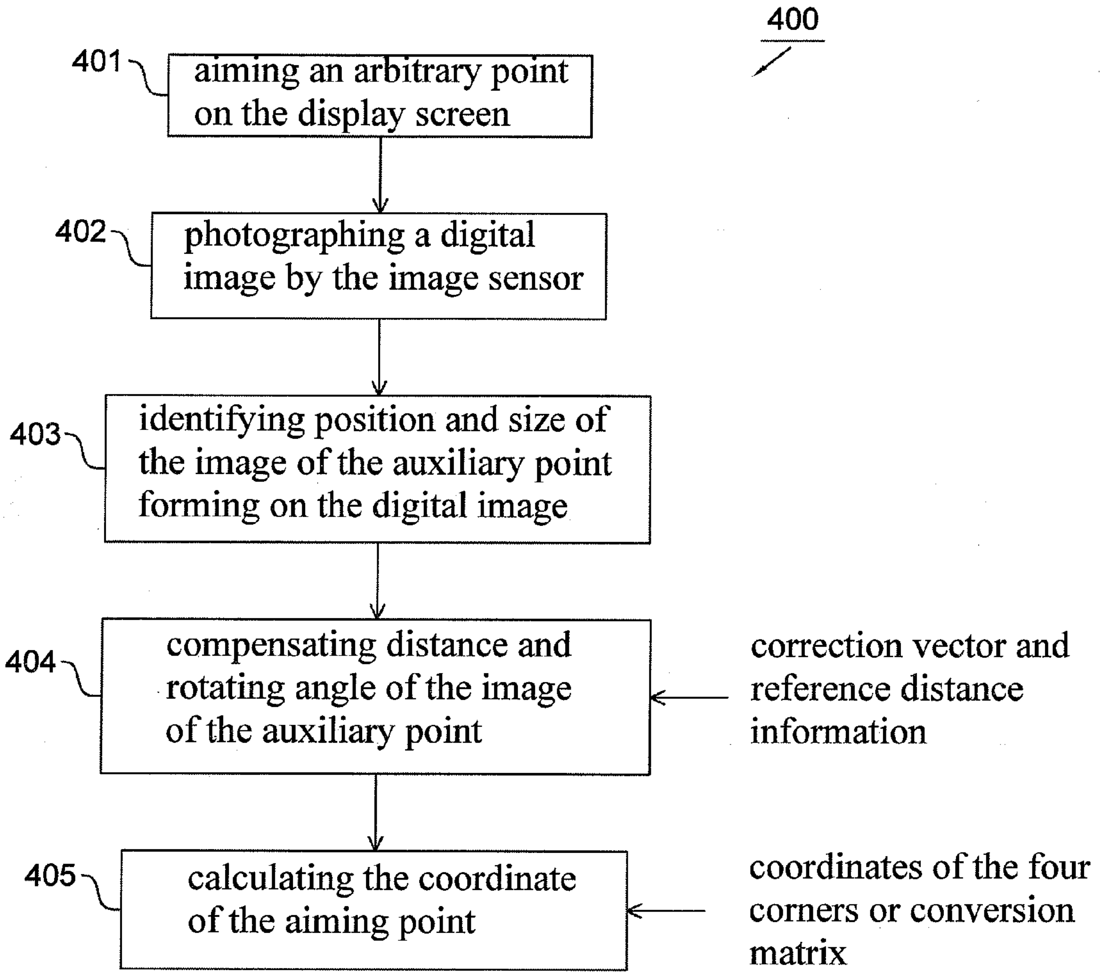
FIG. 2*e* shows a further part of the flow chart of the pointer positioning method based on absolute coordinate according to the first embodiment of the present invention shown in FIG. 2*b*.

Referring to FIG. 2*e*, there is disclosed a flowchart of positioning an arbitrary aiming point, i.e. step 400, which comprises the following steps: aiming an arbitrary point on the display screen 90 by the image sensor 12 (step 401); photographing a digital image by the image sensor 12 (step 402); identifying positions and sizes of the images of the auxiliary points 111 and 112 formed on the digital image (step 403); compensating distance and rotating angle of the images of the auxiliary points 111, 112 by using the correction vector of the optical axis 80 and the reference distance information for correction (step 404); and calculating the coordinate of the arbitrary aiming point (step 405).

Referring to FIG. 2*e* and FIGS. 6 to 8, the details of positioning an arbitrary aiming point step (step 400) are described hereafter. The step 400 is performed based on the initial setup information obtained in steps 200 and 300, including the correction vector of the optical axis 80, the reference distance information, the average coordinates of four corners of the display screen 90 and the conversion matrix. Utilize the aiming point 14 to aim at an arbitrary point on the display screen 90 through the optical axis 80 (step 401), then proceed the photographing a digital image by the image sensor step (step 402), the identifying positions and sizes of the images of the auxiliary points forming on the digital image step (step 403) and the compensating distance and rotating angle of the images of the auxiliary points step (step 404) sequentially. Since their performing procedures are identical to the substeps 302, 303 and 305 of the step 300, they will not be described in detail herein. The coordinate of an arbitrary point calculated by the processing and storage unit 122 has to be calculated based on the coordinates of four corners of the display screen 90 or the conversion matrix obtained in step 300, i.e. if the information stored in the memory of the processing and storage unit 122 are average coordinates of the images of four corners of the display screen 90, the calculating performed in step 405 utilizes the average coordinates of four corners of the display screen 90; on the other hand, if the one stored in the memory of the processing and storage unit 122 is the conversion matrix, the calculating performed in step 405 utilizes the conversion matrix. In this manner, the coordinate of an arbitrary aiming point on the display screen 90 can be obtained (step 405), i.e. the coordinate of the images of an arbitrary aiming point is determined by a plane coordinate system formed by the average coordinates of four corners of the display screen 90 or by the conversion matrix.

Figure 3A:
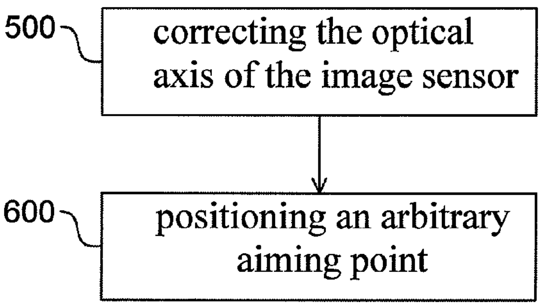
FIG. 3*a* shows a flow chart of positioning an aiming point according to the second embodiment of the present invention, wherein the pointer positioning is based on relative coordinate.

Referring to FIG. 3*a*, there is disclosed a flowchart of correcting and positioning the aiming point 14 of step 190 according to the second embodiment of the present invention, which utilizes a pointer positioning method based on relative coordinate. The differences between the second embodiment and the first embodiment are that the correcting the images of the auxiliary points formed on the image sensor 12 while respectively aiming at four corners of the display screen 90 step, i.e. step 300, is not performed in the second embodiment. Herein a relative reference point on the display screen 90 is defined during the correcting the optical axis of the image sensor step (step 500); the relative reference point also may be selected by a user. The pointer positioning of this embodiment is performed by calculating a spatial relationship between the aiming point 14 aimed through the optical axis 80 and the relative reference point. The pointer positioning method is also applied to position an aiming point 14 on a display screen 90. By disposing two auxiliary points 111 and 112 at the peripheral of the image display for generating a predetermined spectrum, utilizing the image sensor 12 to receive the signals of the predetermined spectrum generated by the auxiliary points 111, 112 and disposing an optical filter 13 in front of the image sensor 12 so as to filter out the spectrum outside the predetermined spectrum such that the image sensor 12 can merely detect the signals of the predetermined spectrum from the auxiliary points 111 and 112. The pointer positioning method includes the following steps: correcting the optical axis of the image sensor (step 500) and positioning an arbitrary point (step 600). Its detailed description will be illustrated hereinafter.

Figure 3B:
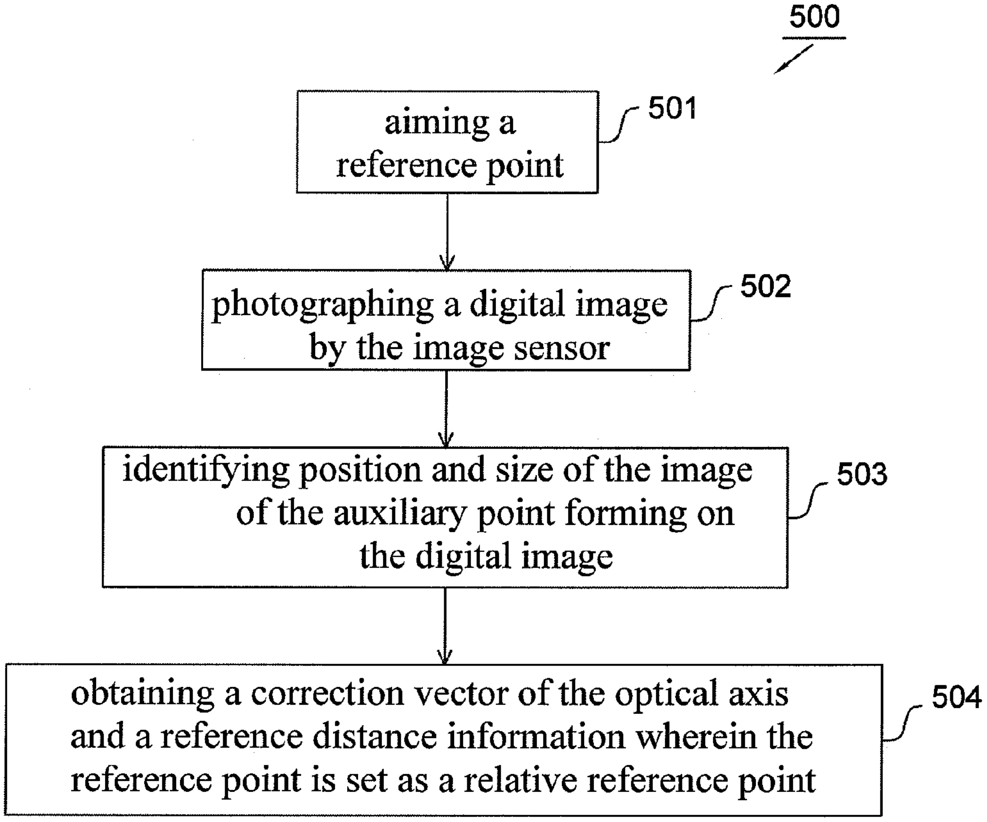
FIG. 3*b* shows part of the flow chart of the pointer positioning method based on relative coordinate according to the second embodiment of the present invention shown in FIG. 3*a*.
Figure 3C:
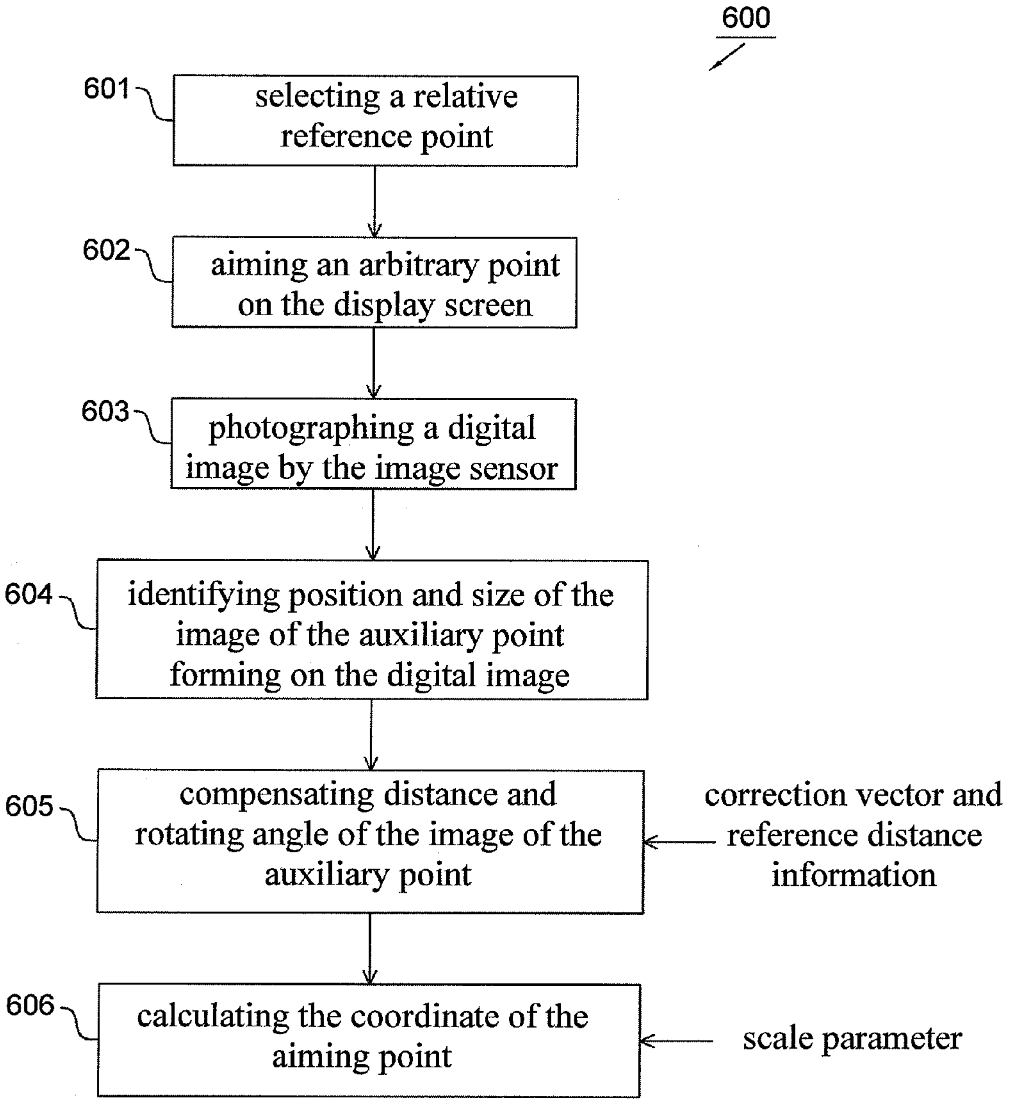
FIG. 3*c* shows another part of the flow chart of the pointer positioning method based on relative coordinate according to the second embodiment of the present invention shown in FIG. 3*a*.

Referring to FIG. 3*b* and FIGS. 4 to 5, the correcting the optical axis of the image sensor step (step 500) is a correction procedure which can be performed before the products using the method leaves the factory; it also can be performed during setup or operation after the products are sold. The correcting the optical axis of the image sensor step comprises: aiming an arbitrary point on the display screen 90 (step 501); photographing a digital image by the image sensor 12 (step 502); identifying positions and sizes of the images of the auxiliary points forming on the digital image (step 503); obtaining a correction vector of the optical axis 80 and a reference distance information (step 504). Since their operating procedures are similar to that in the step 200, they will not be described in detail herein. Only the differences between this embodiment and the first embodiment will be illustrated. In step 504, besides the correction vector of the optical axis 80 and the reference distance information can be obtained as described in the first embodiment, the reference point aimed by the image sensor 12 in the step 501 can further be set as a relative reference point, i.e. an original point of the relative coordinate, and it is utilized as a reference while performing pointer positioning based on relative coordinate (step 504). The position information of the relative reference point is stored in the processing and storage unit 122.

Figure 9:
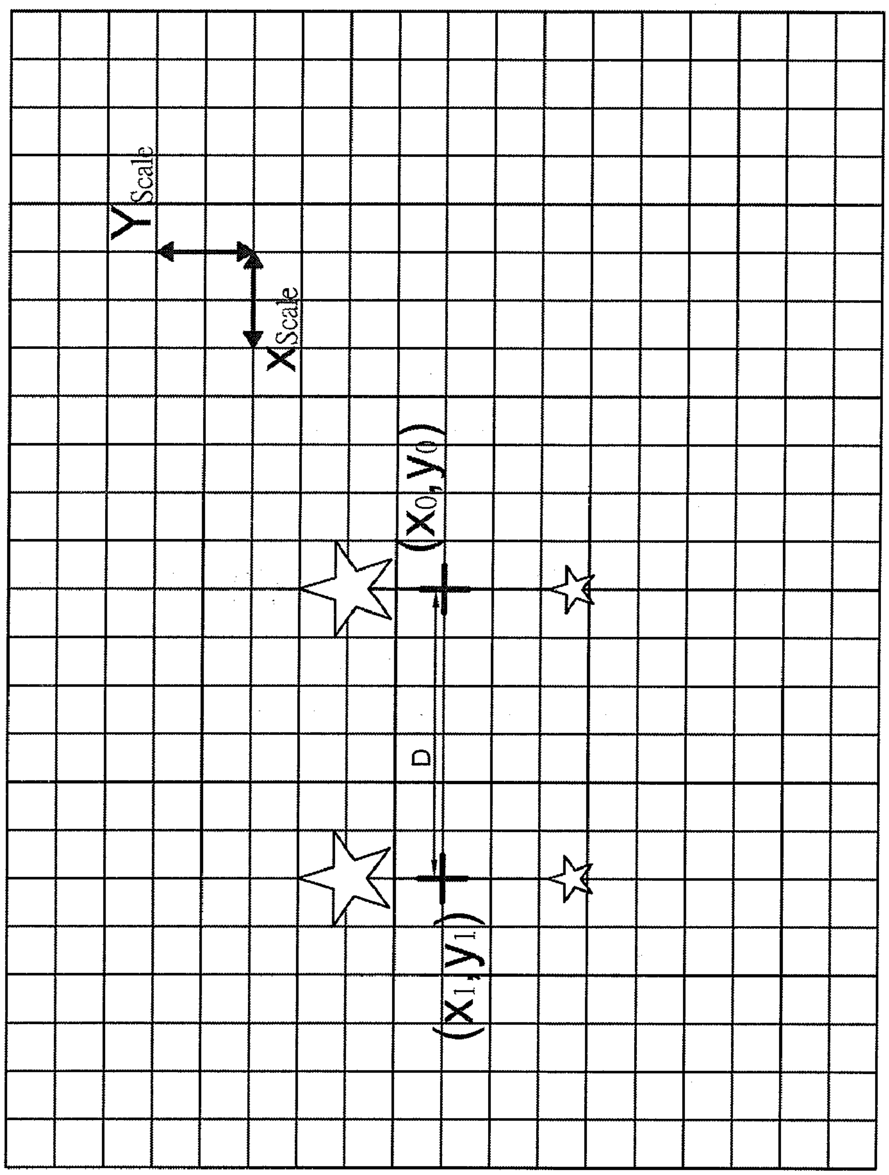
FIG. 9 shows a schematic diagram of the sensitivity adjusting by means of a scale parameter used in the pointer positioning device and method according to the embodiments of the present invention.

Referring to FIG. 3*c* and FIGS. 6 to 9, the positioning an arbitrary point step (step 600) comprises the following steps: aiming an arbitrary point on the display screen 90 (step 602); photographing a digital image by the image sensor 12 (step 603); identifying positions and sizes of the images of the auxiliary points formed on the digital image (step 604); compensating distance and rotating angle of the images of the auxiliary points 111, 112 by utilizing the correction vector of the optical axis 80 and the reference distance information for correction (step 605); and calculating the position of the aiming point (step 606). Their performing procedures are similar to that of the step 400 illustrated in the first embodiment and they will not be described in detail, therefore only the differences therebetween will be described herein. Before performing the positioning of an arbitrary point step, in addition to the relative reference point selected in the step 500 can be used as a reference point in the relative coordinate, a user can define a relative reference point according to his usual habit (step 601). For example, in this embodiment a point ($x_0$, $y_0$) is selected as the relative reference point either in step 504 or by a user, as shown in FIG. 9, and the calculation of the movement of the aiming point 14 is based on this reference point. If the relative reference point is defined in step 504, then this step can be ignored. In addition, during the calculating the coordinate of the aiming point step, a scale parameter ($X_{scale}$, $Y_{scale}$) can be inputted to the processing and storage unit 122 for adjusting the moving sensitivity of the average coordinate ($x_1$, $y_1$) of the images of the auxiliary points 111, 112 related to the relative reference point ($x_0$, $y_0$) on the image sensor 12, and the moving sensitivity can be adjusted according to the following equation (2):

$$(\Delta X, \Delta Y) \equiv \left(\frac{x_1 - x_0}{X_{scale}}, \frac{y_1 - y_0}{Y_{scale}}\right) \tag{2}$$

where $X_{scale}$ and $Y_{scale}$ are adjustable scale parameters, which can be adjusted by a user; $x_0$ and $y_0$ are coordinates of the relative reference point defined by the user or in the step 504; $x_1$ and $y_1$ are the average coordinates of the images of the auxiliary points 111 and 112 formed on the image sensor 12 when the aiming point moves; ΔX and ΔY are the adjusted moving distance. In FIG. 9, D is the moving distance of the current aiming point ($x_1$, $y_1$) with respect to the relative reference point ($x_0$, $y_0$). It can be understood from equation (2) that when the $X_{scale}$ and $Y_{scale}$ are getting larger, in order to obtain identical moving effect, the moving distance of the aiming point has to be relatively large.

As shown above, because the conventional pointer positioning device and method has to detect information of the whole display screen, it has the problem to recognize the image area and requires a video camera having large viewing angle. As compared to the conventional one, the pointer positioning device and method according to the present invention, as shown in FIGS. 1*a*, 2*a* and 3*a*, utilizes auxiliary points 111, 112 to generate a predetermined spectrum incorporated with an image sensor 12 integrated with an optical filter 13 to perform pointer positioning. The image sensor 12 merely can detect the signals generated from the auxiliary points 111 and 112, therefore, by using the present invention, the viewing angle of the image sensor is decreased; the calculating complexity is simplified; the positioning accuracy is increased and the present invention can be applied to any types of image displays.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A pointer positioning device for positioning an aiming point pointed through an optical axis on a display screen of an image display, said device comprising:

two auxiliary points disposed at a periphery of the display screen and configured to provide light of a predetermined spectrum;

an image sensor configured to receive the light of the predetermined spectrum from the auxiliary points to generate electrical signals;

an optical filter disposed in front of the image sensor and configured to block light outside the predetermined spectrum such that the image sensor only senses the light of the predetermined spectrum; and a processing and storage unit configured to receive the electrical signals and to correct an initial setup and the aiming point according to a correction vector of the optical axis and a reference distance information, wherein the correction vector of the optical axis is obtained by (i) pointing the aiming point, from a predetermined distance, at one of the two auxiliary points and (ii) calculating a vector between an image of the aiming point as captured by the image sensor and an image of said one of the two auxiliary points as captured by the image sensor, and the reference distance information includes (a) a distance between images of the two auxiliary points captured by the image sensor at said predetermined distance, and (b) an average coordinate of the images of the two auxiliary points captured by the image sensor from said predetermined distance, the processing and storage unit is further configured to adjust a moving sensitivity of the aiming point during operation based on at least an adjustable scale parameter, and the aiming point is at least one of a spot projected by a projector, a bullet drop point projected by a light gun, or a cursor controlled by a mouse.

2. The pointer positioning device as claimed in claim 1, wherein the predetermined spectrum is an IR spectrum and the optical filter is an IR filter.

3. The pointer positioning device as claimed in claim 1, wherein each of the auxiliary points is an emitting light source configured to generate light of the predetermined spectrum.

4. The pointer positioning device as claimed in claim 3, wherein each of the auxiliary points is an IR LED.

5. The pointer positioning device as claimed in claim 1, wherein each of the auxiliary points is a non-emitting light source configured to reflect light of the predetermined spectrum.

6. The pointer positioning device as claimed in claim 5, further comprising a light source for generating light of the predetermined spectrum to be reflected by the auxiliary points.

7. The pointer positioning device as claimed in claim 1, wherein the two auxiliary points have an identical size and the image sensor further comprises a mercury switch for facilitating the image sensor to correctly position the aiming point when a rotating angle of the image sensor during image capture is larger than 180 degrees.

8. The pointer positioning device as claimed in claim 1, wherein the two auxiliary points have different sizes for facilitating the image sensor to correctly position the aiming point under any rotating angle of the image sensor during image capture.

9. The pointer positioning device as claimed in claim 1, wherein the auxiliary points are integrated on the image display.

10. The pointer positioning device as claimed in claim 1, wherein the image sensor is a CMOS image sensor or a CCD image sensor.

11. The pointer positioning device as claimed in claim 1, wherein the processing and storage unit is configured to perform distance compensation and to correct the positioning of the aiming point by utilizing a proportional relationship between (a) the distance between the images of the two auxiliary points as captured by the image sensor from said predetermined distance, and the average coordinate of the images of the two auxiliary points as captured by the image sensor from said predetermined distance, and (b) a distance between images of the two auxiliary points as captured by the image sensor from an arbitrary distance while aiming at the same aiming point, and an average coordinate of the images of the two auxiliary points as captured by the image sensor from said arbitrary distance while aiming at the same aiming point.

12. A pointer positioning method performed by a pointer positioning device, the pointer positioning device comprising:

two auxiliary points disposed at a periphery of an image display to provide light of a predetermined spectrum, an image sensor which points an aiming point with an optical axis on a plane formed by a display screen of the image display and receives the light of the predetermined spectrum from the two auxiliary points, an optical filter disposed in front of the image sensor to block light outside the predetermined spectrum , and a processing and storage unit;

the method comprising the steps of:

providing, by the two auxiliary points, light of the predetermined spectrum;

receiving, through the optical filter and by the image sensor, the light of the predetermined spectrum from the auxiliary points;

correcting and positioning the aiming point, by the processing and storage unit, according to a correction vector of the optical axis and a reference distance information, wherein the reference distance information includes (i) a distance between images of the two auxiliary points as captured by the image sensor from a predetermined distance, and (ii) an average coordinate of the images of the two auxiliary points as captured by the image sensor from said predetermined distance; and the correction vector of the optical axis is obtained by (i) pointing the aiming point, from the predetermined distance, at one of the two auxiliary points and (ii) calculating a vector between an image of the aiming point as captured by the image sensor and the image of said one of the two auxiliary points as captured by the image sensor;

pointing the aiming point to four corners of the display screen to respectively capture a digital image and calculating coordinates of the four corners of the display screen on the digital image based on the images of the auxiliary points corrected by the correction vector of the optical axis;

calculating a position of the aiming point according to the coordinates of the four corners of the display screen on the digital image; and adjusting, by the processing and storage unit, a moving sensitivity of the aiming point during operation based on at least an adjustable scale parameter, wherein the aiming point is at least one of a spot projected by a projector, a bullet drop point projected by a light gun, or a cursor controlled by a mouse.

13. The pointer positioning method as claimed in claim 12, wherein the correction vector of the optical axis is further obtained by the steps of:

pointing the image sensor to an auxiliary point and capturing a digital image by the image sensor;

identifying positions and sizes of the images of the auxiliary points on the digital image; and obtaining the correction vector of the optical axis based on the positions and sizes of the images of the auxiliary points on the digital image.

14. The pointer positioning method as claimed in claim 12, further comprising the step of:

calculating a conversion matrix from the coordinates of the four corners of the display screen on the digital image.

15. The pointer positioning method as claimed in claim 14, wherein the conversion matrix is calculated by projective transformation.

16. The pointer positioning method as claimed in claim 14, wherein the calculation of the positioning of the aiming point is based on the conversion matrix.

17. The pointer positioning method as claimed in claim 12, wherein the predetermined spectrum is an IR spectrum.

18. An image sensor for positioning an aiming point pointed through an optical axis on a display screen of an image display, wherein an optical filter is disposed in front of the image sensor such that the image sensor only senses light of a predetermined spectrum coming from a plurality of auxiliary points disposed at a periphery of the display screen, and wherein the auxiliary points are utilized as reference points for correcting an initial setup and positioning the aiming point, the image sensor comprising:

a sensing unit for receiving the light of the predetermined spectrum from the auxiliary points and converting the light of the predetermined spectrum into electrical signals; and a processing and storage unit for receiving the electrical signals, correcting the initial setup and calculating the positioning of the aiming point according to a correction vector of the optical axis and a reference distance information, wherein the correction vector of the optical axis is obtained by (i) pointing the aiming point, from a predetermined distance, at one of the two auxiliary points and (ii) calculating a vector between an image of the aiming point as captured by the image sensor and an image of said one of the auxiliary points as captured by the image sensor, the reference distance information includes (a) a distance between images of the two auxiliary points captured by the sensing unit at said predetermined distance, and (b) an average coordinate of the images of the plurality of auxiliary points captured by the sensing unit from said predetermined distance, the processing and storage unit is further configured to adjust a moving sensitivity of the aiming point during operation based on at least an adjustable scale parameter, and the aiming point is at least one of a spot projected by a projector, a bullet drop point projected by a light gun, or a cursor controlled by a mouse.

19. The image sensor as claimed in claim 18, wherein the sensing unit is a CMOS image sensor or a CCD image sensor.

20. The image sensor as claimed in claim 18, further comprising a light source for generating light of the predetermined spectrum to be reflected by the auxiliary points.

21. The image sensor as claimed in claim 18, further comprising a mercury switch for facilitating the image sensor to correctly position the aiming point when a rotating angle of the image sensor during image capture is larger than 180 degrees.

22. The image sensor as claimed in claim 18, wherein the predetermined spectrum is an IR spectrum.

23. The pointer positioning device as claimed in claim 1, wherein the processing and storage unit is configured to adjust the moving sensitivity of the aiming point as follows:

$$(\Delta X, \Delta Y) \equiv \left(\frac{x_1 - x_0}{X_{scale}}, \frac{y_1 - y_0}{Y_{scale}}\right)$$

where $X_{scale}$ and $Y_{scale}$ are adjustable scale parameters, $x_0$ and $y_0$ are coordinates of a relative reference point, $x_1$ and $y_1$ are average coordinates of the images of the two auxiliary points as captured by the image sensor; and $\Delta X$ and $\Delta Y$ are adjusted moving distances of the aiming point.

24. The pointer positioning method as claimed in claim 12, wherein the moving sensitivity of the aiming point is adjusted as follows:

$$(\Delta X, \Delta Y) \equiv \left(\frac{x_1 - x_0}{X_{scale}}, \frac{y_1 - y_0}{Y_{scale}}\right)$$

where $X_{scale}$ and $Y_{scale}$ are adjustable scale parameters, $x_0$ and $y_0$ are coordinates of a relative reference point, $x_1$ and $y_1$ are average coordinates of the images of the two auxiliary points as captured by the image sensor; and $\Delta X$ and $\Delta Y$ are adjusted moving distances of the aiming point.

* * * * *